US009146513B2

(12) United States Patent
Eguchi

(10) Patent No.: US 9,146,513 B2
(45) Date of Patent: Sep. 29, 2015

(54) IMAGE FORMING APPARATUS AND IMAGE PROCESSING METHOD HAVING TONE CORRECTION

(75) Inventor: Kimimori Eguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1621 days.

(21) Appl. No.: 11/746,855

(22) Filed: May 10, 2007

(65) Prior Publication Data

US 2007/0292156 A1 Dec. 20, 2007

(30) Foreign Application Priority Data

May 15, 2006 (JP) ................................ 2006-135864

(51) Int. Cl.
*G06F 15/00* (2006.01)
*G03G 15/00* (2006.01)

(52) U.S. Cl.
CPC ...... *G03G 15/50* (2013.01); *G03G 2215/00029* (2013.01); *G03G 2215/00063* (2013.01)

(58) Field of Classification Search
USPC .......................................................... 358/1.2
See application file for complete search history.

(56) References Cited

U.S. PATENT DOCUMENTS

| | | | | |
|---|---|---|---|---|
| 5,315,382 | A * | 5/1994 | Tanioka | 358/523 |
| 2002/0008762 | A1* | 1/2002 | Takemoto | 348/223 |
| 2002/0012126 | A1* | 1/2002 | Nakamura | 358/1.9 |
| 2003/0156120 | A1* | 8/2003 | Sasanuma | 345/600 |
| 2004/0218223 | A1* | 11/2004 | Bernardi et al. | 358/3.26 |
| 2005/0057776 | A1* | 3/2005 | Furukawa et al. | 358/2.1 |
| 2006/0197998 | A1* | 9/2006 | Shibuya et al. | 358/518 |
| 2007/0106962 | A1* | 5/2007 | Sakakibara et al. | 716/1 |

FOREIGN PATENT DOCUMENTS

JP 9-247471 A 9/1997

* cited by examiner

*Primary Examiner* — Helen Q Zong
(74) *Attorney, Agent, or Firm* — Fitzpatrick, Cella, Harper & Scinto

(57) ABSTRACT

An image forming apparatus comprises an operation unit which performs an operation for calculating amount data of a printing material which indicates an amount of a printing material required to form the image, a reduction processing unit which changes, when it is determined that the amount of a printing material needs to be reduced, the amount data of the printing material to a value corresponding to the reduced amount of the printing material, an inverse operation unit which perform an inverse operation of the operation for the amount data of the printing material, after processing by the reduction processing unit, and an image forming unit configured to form an image on the basis of amount data of a printing material for which an inverse operation is performed.

11 Claims, 20 Drawing Sheets

IMAGE FORMING APPARATUS AND IMAGE PROCESSING METHOD HAVING TONE CORRECTION

BACKGROUND OF THE INVENTION

1. Field of the Invention

The present invention relates to an image forming apparatus of, e.g., an electrophotographic method and an image processing method thereof. More specifically, the present invention relates to an image forming apparatus and image processing method for reducing the amount of printing material without deteriorating the image.

2. Description of the Related Art

In an electrophotographic printer (including an apparatus with a printer unit, such as a copying machine), when the amount of toner as a printing material exceeds a predetermined value, defective toner fixing or toner scattering sometimes occurs. Defective fixing and toner scattering not only deteriorate image quality but also damage the printer apparatus body. To solve this problem, toner reduction is performed in image processing before forming an image. Toner reduction is also referred to as TOR. As one of the toner reduction methods, a method has been proposed in which a color conversion processing unit manipulates values of a conversion table upon converting a colorimetric system from L*a*b* as a standard colorimetric system into CMYK as a colorimetric system of an output device (see, Japanese Patent Laid-Open No. 9-247471). In Japanese Patent Laid-Open No. 9-247471, a color conversion table in which CMYK color values corresponding to L*a*b* lattice points are registered is used to convert L*a*b* into CMYK. In this color conversion table, the CMYK color values are registered such that the total amount of the output colors of the lattice points becomes smaller than a limit value (e.g., 250% when the maximum value is 100%) permitted for output. When an image is formed, a printing material is used in an amount corresponding to a pixel value. Hence, the above processing prevents the total value of CMYK after color conversion from exceeding the limit value, thereby reducing the amount of ink or toner.

However, in a conventional image forming apparatus, the toner amount has been further reduced in a process between toner reduction and actual printing. This is because, in the electrophotographic method, an input pixel value (e.g., density value) and density of an image formed based on the pixel value do not have a linear relationship. In order to correct the nonlinear relationship of the input pixel value and image density to the linear relationship, the input pixel value is converted. The toner amount is further reduced due to this conversion. This conversion will be referred to as print tone correction, hereinafter. Print tone correction includes gamma correction and correction of a change with time of output density of a printer. In the electrophotographic method, the density of a formed image tends to become higher than the desired density as time elapses. To solve this problem, print tone correction is performed to nonlinearly convert the input pixel value such that densities, particularly intermediate densities, become lower. That is, when input pixel values are plotted along the abscissas and output pixel values are plotted along the ordinates, the conversion characteristic curve of print tone correction is concave downward; the print tone correction decreases the input pixel values.

When toner reduction is performed before print tone correction, a pixel value decreased by the toner reduction is further decreased by the subsequent print tone correction. FIGS. 4 and 5 show examples of the toner amount when a single-colored input image is printed in which the sum of the pixel values of each color component is 300% of the maximum value of each color component. FIG. 4 is a view showing the sum of the CMYK toner amount when no toner reduction is performed. FIG. 5 is a view showing the sum of the CMYK toner amounts when toner reduction is performed.

As shown in FIG. 4, even when the sum value of each color component (CMYK) of the input pixel value is 300% of the maximum value of each color component, it becomes 200% due to the print tone correction. When a limit value is 250%, the density is converted into that equal to or smaller than the limit value, without performing toner reduction.

On the other hand, as shown in FIG. 5, when the sum value of each color component of the input pixel value is 300% of the maximum value of each color component, since it exceeds a limit value of 250%, toner reduction is performed. As a result, the sum of the pixel values of each color component is converted into a value equal to or smaller than the limit value, i.e., 250%. After that, the sum of the pixel values is further decreased down to 180% by the subsequent print tone correction. That is, toner reduction is excessively performed. Excessive toner reduction results in deterioration of tone characteristics of image data and quality of a formed image.

In the above-described toner reduction technique, even when toner reduction is performed while setting a temporary limit value larger than the proper limit value as a threshold in consideration of the final reduction of the toner amount, it is difficult to reduce the toner amount strictly within the limit value.

SUMMARY OF THE INVENTION

The present invention has been made in consideration of the above-described conventional example, and has as its object to provide an image forming apparatus and image processing method in which the above problem is solved. More specifically, the present invention has as its object to provide an image forming apparatus and image processing method capable of preventing image deterioration caused by an excessive limitation of the toner amount.

The present invention has the following structure. That is, there is provided an image forming apparatus which forms an image using a printing material, comprising an operation unit adapted to perform an operation for calculating, on the basis of image data which represents an image, amount data of a printing material which indicates an amount of a printing material required to form the image, a reduction processing unit adapted to change, when it is determined based on the amount data of the printing material calculated by the operation unit that an amount of a printing material needs to be reduced, the amount data of the printing material to a value corresponding to the reduced amount of the printing material, an inverse operation unit adapted to perform an inverse operation of the operation performed by the operation unit for the amount data of the printing material, after processing by the reduction processing unit, and an image forming unit adapted to form an image on the basis of amount data of a printing material for which an inverse operation is performed by the inverse operation unit.

There is also provided an image forming apparatus comprising an operation unit adapted to perform, by using a color conversion table, an operation which converts input image data represented by a first calorimetric system into amount data of a printing material represented by a second calorimetric system, a reduction processing unit adapted to change, when it is determined based on amount data of a printing material calculated by the operation unit that an amount of a printing material needs to be reduced, the amount data of the printing material to a value corresponding to the reduced amount of the printing material, an inverse operation unit adapted to perform for the amount data of the printing material an inverse operation of the operation performed by the operation unit, after processing by the reduction processing unit, an update unit adapted to update the color conversion table on the basis of amount data of a printing material for which an inverse operation is performed by the inverse operation unit, and an image forming unit adapted to form an image on the basis of amount data of a printing material, wherein the conversion unit converts input image data by using a color conversion table updated by the update unit, and the image forming unit forms an image on the basis of image data converted using a color conversion table updated by the update unit.

According to the above-described structure, excessive toner reduction is prevented, therefore deterioration of image quality caused by the excessive toner reduction can be prevented. In addition, by reflecting image quality control or gamma correction performed after the toner reduction, toner scattering and defective toner fixing which occur when the toner amount exceeds a limit value can be prevented.

Further features of the present invention will become apparent from the following description of exemplary embodiments with reference to the attached drawings.

BRIEF DESCRIPTION OF THE DRAWINGS

FIG. 5 is a view showing how a toner amount is reduced by both the toner amount control and print tone correction when the toner control is on;

DESCRIPTION OF THE EMBODIMENTS

A detail of toner reduction performed in an image forming apparatus according to an embodiment of the present invention will be described with reference to the accompanying drawings.

First Embodiment

<Block Diagram of Image Forming Apparatus>

Figure 1:
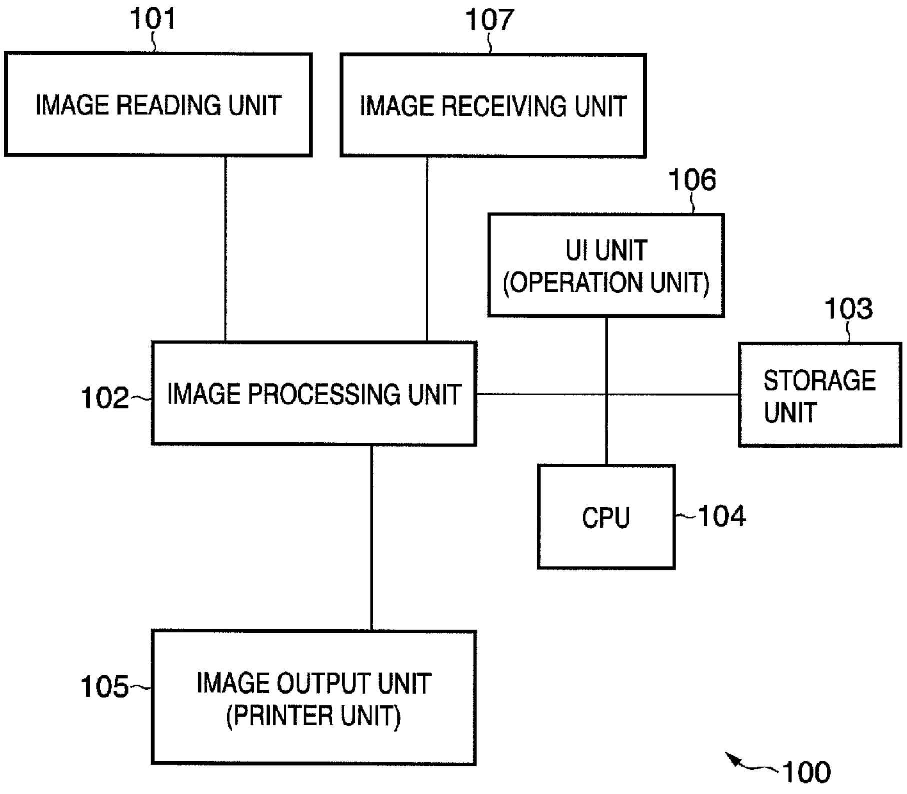
FIG. 1 is a schematic block diagram of an image forming apparatus according to an embodiment of the present invention.

FIG. 1 is a schematic block diagram of an image forming apparatus according to an embodiment of the present invention. Although a digital multifunction device and the like is assumed as the image forming apparatus in this embodiment, not only a copying machine but also another printing device such as a color printer can be considered in the same manner.

The structure of the image forming apparatus according to this embodiment will be described first. As shown in FIG. 1, an image forming apparatus 100 comprises an image reading unit 101, image processing unit 102, storage unit 103, CPU 104, image output unit 105, UI unit 106, and image receiving unit 107. The image forming apparatus is connectable through a network such as a LAN or the Internet to, e.g., a server which manages image data and a personal computer (PC) which indicates execution of print to the image forming apparatus.

The operation of each component of the image forming apparatus shown in FIG. 1 will be described next. The image reading unit 101 reads an input image. For example, the image reading unit 101 reads a CMYK color image and the like. The image processing unit 102 converts transmitted print information into intermediate information (to be referred to as an "object", hereinafter) and stores the converted information in an object buffer. At this time, image processing such as density correction is performed. The image processing unit 102 generates bitmap data on the basis of the buffer object, and stores the generated bitmap data in a band buffer. At this time, dither processing, halftone processing, or the like is performed. The image processing unit 102 can be constituted of, e.g., a CPU, a memory, and a program executed by the CPU to implement the above-described functions.

The structures and operations of the storage unit 103, CPU 104, and image output unit 105 of the image forming apparatus shown in FIG. 1 will be described next. The storage unit 103 includes various kinds of storage media such as a random access memory (RAM) and a read-only memory (ROM). For example, the RAM is used as an area to store data and various kinds of information and a work area. On the other hand, the RON is used as an area to store various kinds of control programs. The CPU 104 is used to determine and control various types of processing in accordance with a program stored in the ROM. The image output unit 105 operates to output (e.g., form an image on a printing medium such as printing paper and output) an image.

Figure 10:
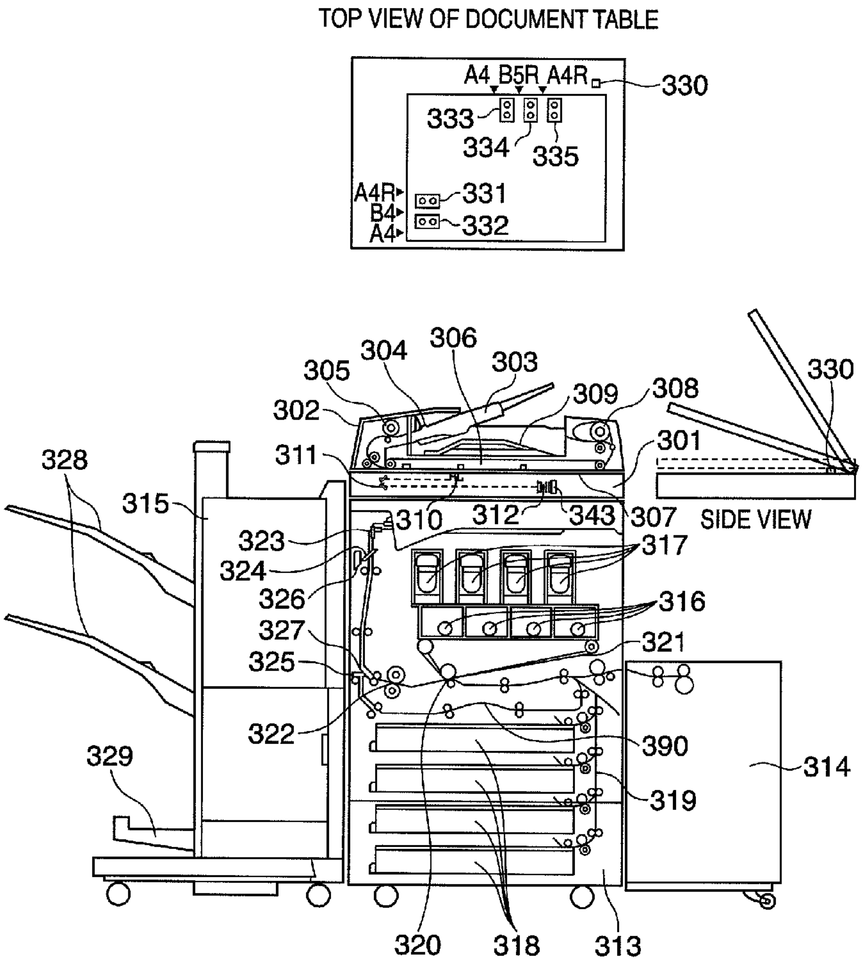
FIG. 10 is a view schematically showing the hardware arrangement of an image reading unit 101 and image output unit 105 of the image forming apparatus shown in FIG. 1.

FIG. 10 is a sectional view of the image forming apparatus and schematically shows the hardware arrangement of the image reading unit 101 and image output unit 105 of the image forming apparatus shown in FIG. 1. Referring to FIG. 10, a further detailed structure of the image forming apparatus mentioned with reference to FIG. 1 will be described. This image forming apparatus has functions of a copying machine, printer, and facsimile apparatus.

The image reading unit 101 and image output unit 105 shown in FIG. 1 are integrally arranged as a scanner unit 301 and printer unit 310, as shown in FIG. 10. In FIG. 10, the image forming apparatus of the first embodiment comprises the scanner unit 301, a document feeder (DF) 302, the printer unit 310 for printing including four color drums, a paper feed deck 314, a finisher 315, and the like.

First, a reading operation performed mainly by the scanner unit 301 will be described. When a document sheet is to be set on a document table 307 to read, a user sets the document sheet on the document table 307 and closes the DF 302. After an open/close sensor 330 detects that the document table 307 is closed, reflecting type document size detection sensors 331 to 335 in the housing of the scanner unit 301 detect the size of the set document sheet. With this size detection as the starting signal, a light source 310 irradiates the document sheet. A CCD (Charge-Coupled Device) 343 receives light reflected by the document sheet via a reflector 311 and lens 312, thereby reading an image. A controller of the image forming apparatus converts image data read by the CCD 343 into a digital signal and converts the digital signal into a laser recording signal by performing desired image processing. The converted recording signal is stored in a memory in the controller.

When a document is to be set in the DF 302 to be read, a user places the document face-up on a tray of a document set unit 303 of the DF 302. A document sensor 304 detects that the document is set, and a document feed roller 305 and conveyor belt 306 rotate to convey a document sheet and set it in a predetermined position on the document table 307. After that, an image is read in the same manner as in the reading operation on the document table 307, and the obtained recording signal is stored in the memory in the controller.

When the reading operation is ended, the conveyor belt 306 rotates again to send the document sheet to the right side in the sectional view of the image forming apparatus in FIG. 10. The document sheet is discharged via a conveying roller 308 on the discharge side onto a document discharge tray 309. When there is a plurality of document sheets, as soon as one document sheet is conveyed and discharged to the right side in the sectional view of the image forming apparatus, the next document sheet is fed from the left side via the feeding roller 305. In this manner, the reading operation of the next document sheet is continuously performed. The operation of the scanner unit 301 is as described above.

A printing operation performed mainly by the printer unit 310 will be described next. The recording signal (print image data) temporarily stored in the memory in the controller is transferred to the printer unit 310, wherein a laser recording unit converts the recording signal into recording laser beams of four colors, i.e., yellow, magenta, cyan, and black. The recording laser beams irradiate photosensitive bodies 316 of respective colors and form electrostatic latent images on the respective photosensitive bodies. The printer unit 310 performs toner development to the respective photosensitive bodies by using toners supplied from a toner cartridge 317. Toner images visualized on the photosensitive bodies are primarily transferred onto an intermediate transfer belt 321. The intermediate transfer belt 321 rotates in the clockwise direction in FIG. 10. When a printing sheet fed from a paper cassette 318 or paper feed deck 314 through a paper feeding path 319 reaches a secondary transfer position 320, the toner image is transferred from the intermediate transfer belt 321 onto the printing sheet.

The toners on the printing sheet with the transferred image are fixed by a fixing unit 322 by heat and pressure. The printing sheet is then conveyed through a paper discharge path and discharged onto a faced-down paper center tray 323, switched back and discharged to a discharge port 324 to the finisher, or discharged onto a faced-up paper side tray 325 (note that the side tray 325 has a discharge port available only when no finisher 315 is mounted). Flappers 326 and 327 switch the feeding path to switch the discharge port. When double-sided printing is performed, the flapper 327 switches the feeding path after the printing sheet passes the fixing unit 322. The printing sheet is switched back, sent down, and fed to the second transfer position 320 again via a feeding path 330 for double-sided printing, wherein double-sided printing is performed.

An operation performed by the finisher 315 will be described next. The finisher 315 performs a post process to printed sheets in accordance with a function designated by a user. More specifically, the finisher 315 has functions such as stapling (single position stapling, two position stapling), punching (two holes, three holes), saddle stitching binding, and the like. The image forming apparatus in FIG. 10 has two discharge trays 328. A printing sheet passed through the discharge port 324 to the finisher 315 is discharged to one of discharge trays 328 in accordance with the user's setting, e.g., for the function of copying machine, printer, or facsimile apparatus. The print engine 310 includes four color drums. However, it may be an engine with one color drum, or a printer engine for monochrome printing. When the image forming apparatus in FIG. 10 is used as a printer, a variety of settings such as monochrome print/color print, paper size, 2 UP/4 UP/N-UP printing, double-sided printing, stapling, punching, saddle stitch binding, inserting paper, front cover, back cover, and the like are available by the driver.

<Toner Reduction Processing>

Figure 2A:
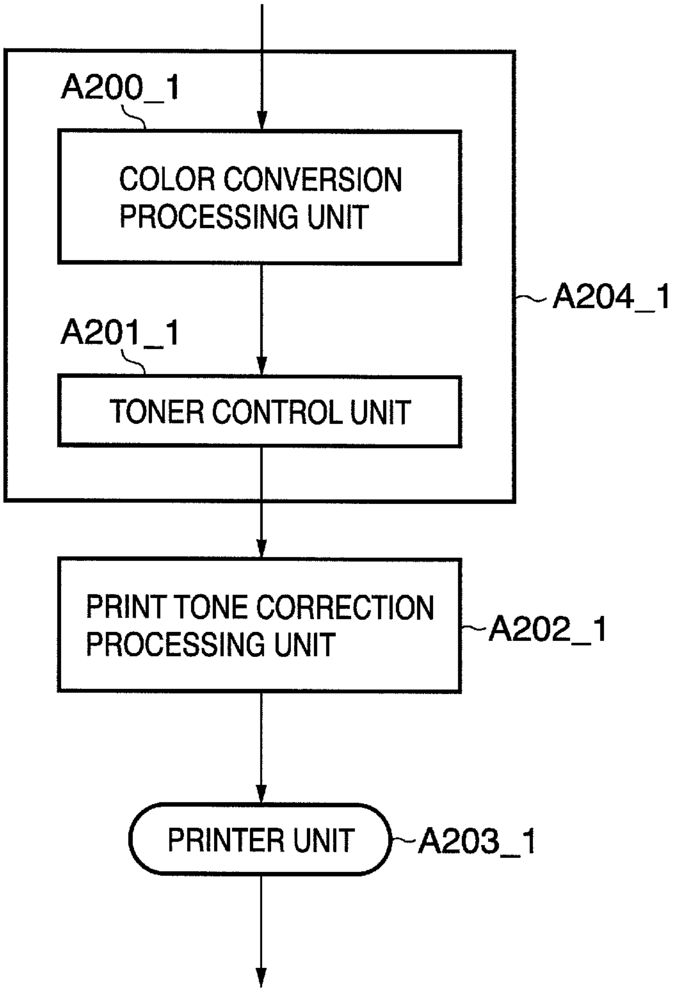
FIG. 2A is a view schematically showing the image processing and device processing performed when toner reduction is performed after a color conversion processing unit according to the first embodiment.

Specific processing for reducing a toner amount will be described next. Toner reduction is shown in FIG. 2A. Note that "printer" in FIGS. 2A to 3B corresponds to the image output unit 105. The blocks other than "printer" represent the functions executed by the image processing unit 102. The functions of the image processing unit 102 are sometimes implemented by hardware. However, they may be implemented by a program that executes the sequences shown in FIGS. 2A to 3B. In this case, a "unit" in FIGS. 2A to 3B represents a "step" to be performed by the CPU. This also applies to FIGS. 7A to 9B, 11A, and 11B.

FIG. 2A is a view schematically showing a part of processing of the image processing unit 102 and that of the image output unit 105. A unit A200_1 in the image processing unit 102 is a color conversion processing unit which performs color conversion from an RGB image into a CMYK image. A unit A201_1 is a toner control unit which reduces a toner amount when it is larger than a limit value. A unit A202_1 is a print tone correction processing unit which performs gamma conversion and correction of a change with time of output density of a printer. A unit A204_1 is the image processing unit 102 which performs various kinds of image processing of, e.g., the units A200_1 and A201_1.

A unit S203_1 included in the image output unit 105 is a printer unit which performs printing based on an image processing result.

Figure 7A:
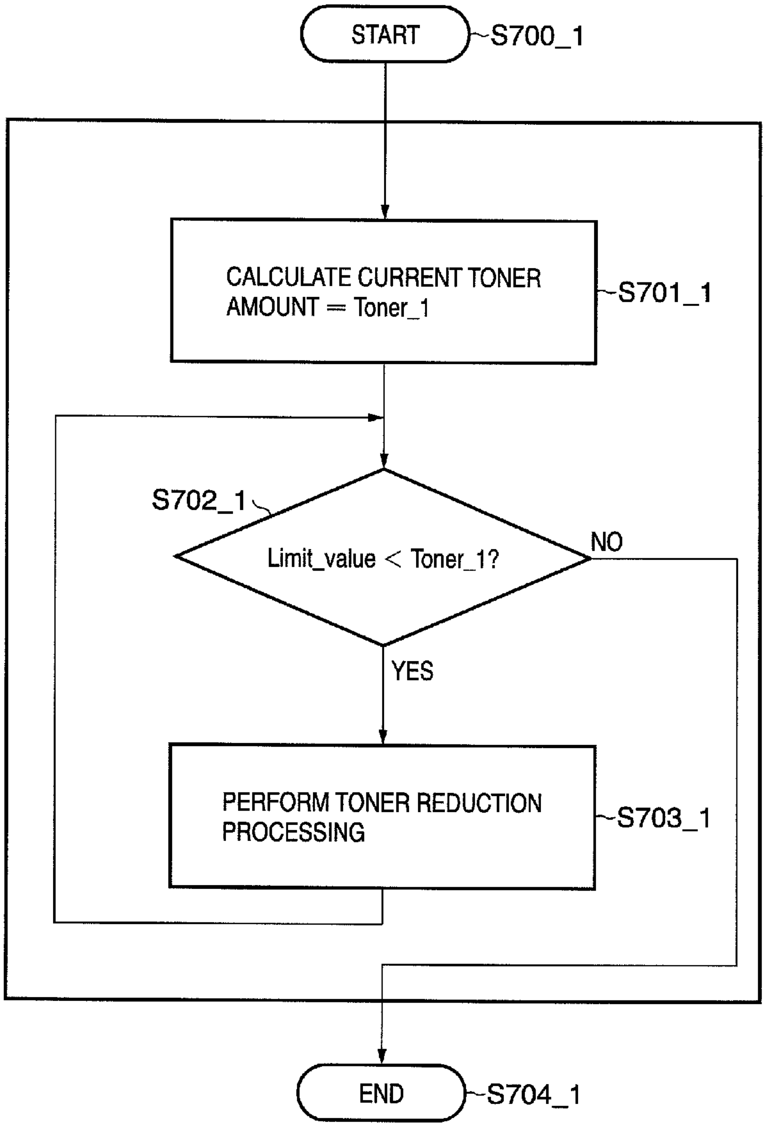
FIG. 7A is a flowchart showing the process step of reducing a toner amount according to the first conventional method.

FIG. 7A shows the processing sequence according to the conventional method performed in the toner control unit A201_1 shown in FIG. 2A. The processing sequence shown in FIG. 7A will be described below. The processing is performed for each pixel.

S700_1: Start

S701_1: A current toner amount Toner_1 is calculated from C, M, Y, and K values of an input pixel. For example, a value obtained by adding C, M, Y, and K values of the input pixel is calculated as the current toner amount.

S702_1: The sum of the C, M, Y, and K values of the input pixel is compared with a predetermined limit value, Limit_value. When the sum of CMYK values is larger, the process advances to S703_1. Otherwise, the process advances to S704_1.

S703_1: The C, M, Y, and K color values are updated by performing toner reduction processing, and the process advances to S702_1. For example, a predetermined portion of each C, M, and Y color value is replaced by a K component. With this process, the CMY toner amounts can be reduced.

S704_1: End

The processing steps of the conventional method have been described above. The conventional method excessively reduces the toner amount by, e.g., print tone correction (gamma conversion, correction of a change with time of the output density of the printer, and the like) performed after the toner reduction. That is, in the conventional method, the toner control unit A201_1 excessively reduces the toner amount since toner reduction caused by print tone correction is not considered.

Figure 7B:
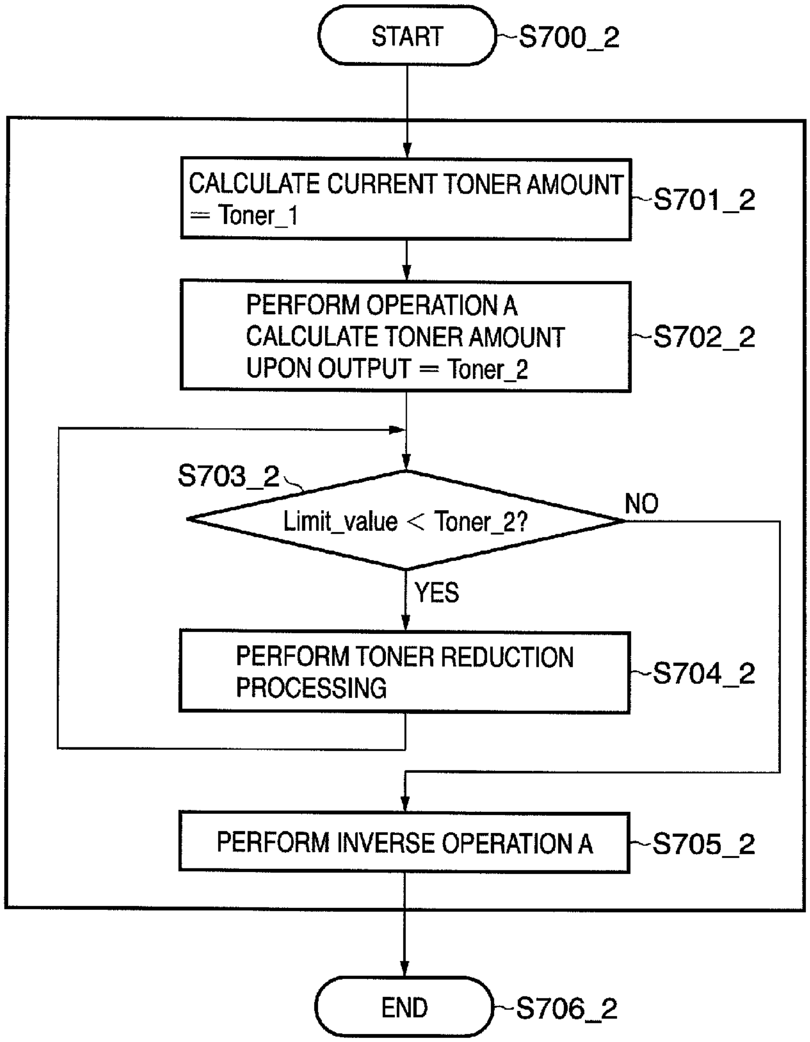
FIG. 7B is a flowchart showing the process step of reducing a toner amount according to the first embodiment.

Since gamma processing is performed for linearly converting input/output characteristics of a printer, it is preferably performed after color processing. In addition, since toner reduction may lose a color component in a lossy manner, color processing such as density control is desirably performed after toner reduction. FIG. 7B shows the processing sequence, according to the present invention, executed in the toner control unit A201_1 in FIG. 2A. The processing sequence shown in FIG. 7B will be described below.

S700_2: Start

S701_2: A current toner amount Toner_2 is calculated from C, M, Y, and K values of an input pixel in the same manner as in S701_1 in FIG. 7A, and the process advances to the next step. Note that this process may be omitted.

Figure 6:
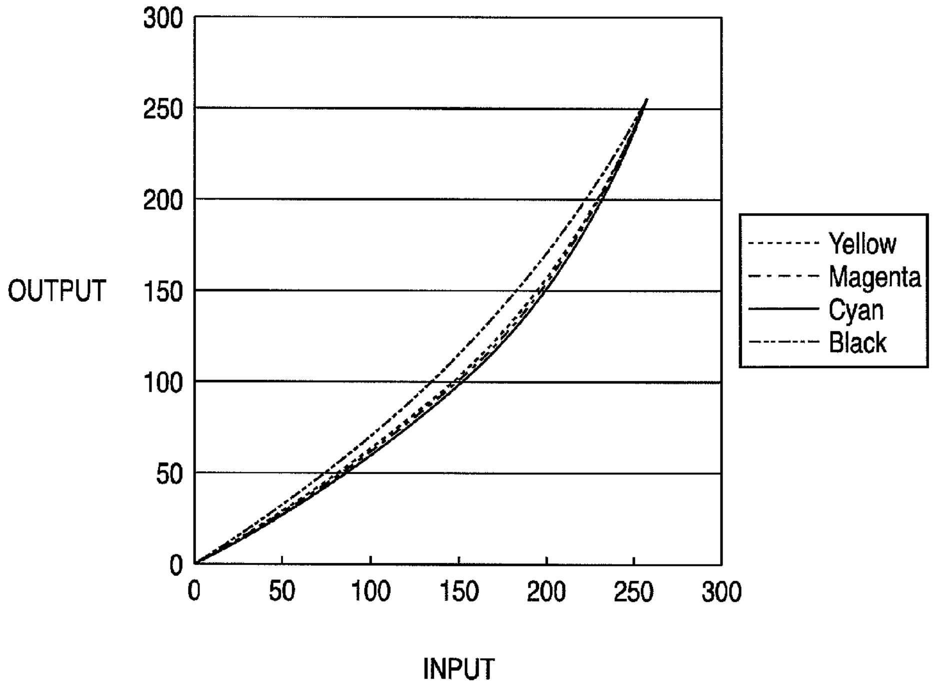
FIG. 6 is a graph of a tone correction LUT.

S702_2: Color component values C1, M1, Y1, and K1 for printer output are calculated from the C, M, Y, and K values of the input pixel using a tone correction LUT, and the process advances to the next step. The tone correction LUT is given in advance based on gamma characteristics and calibration and has the concave downward input/output characteristics, as shown in FIG. 6, when, for example, 8-bit data is input/output. That is, the conversion decreases the values.

S703_2: The sum of the color component values C1, M1, Y1, and K1 for printer output is compared with a limit value, referred to as Limit_value from hereon. When the sum of C1, M1, Y1, and K1 is larger, the process advances to S704_2. Otherwise, the process advances to S705_2.

S704_2: Toner reduction processing is performed in the same manner as in S703_1 in FIG. 7A, and the C1, M1, Y1, and K1 are respectively replaced by the color component values after the toner reduction processing. The process advances to S703_2.

Figure 12:
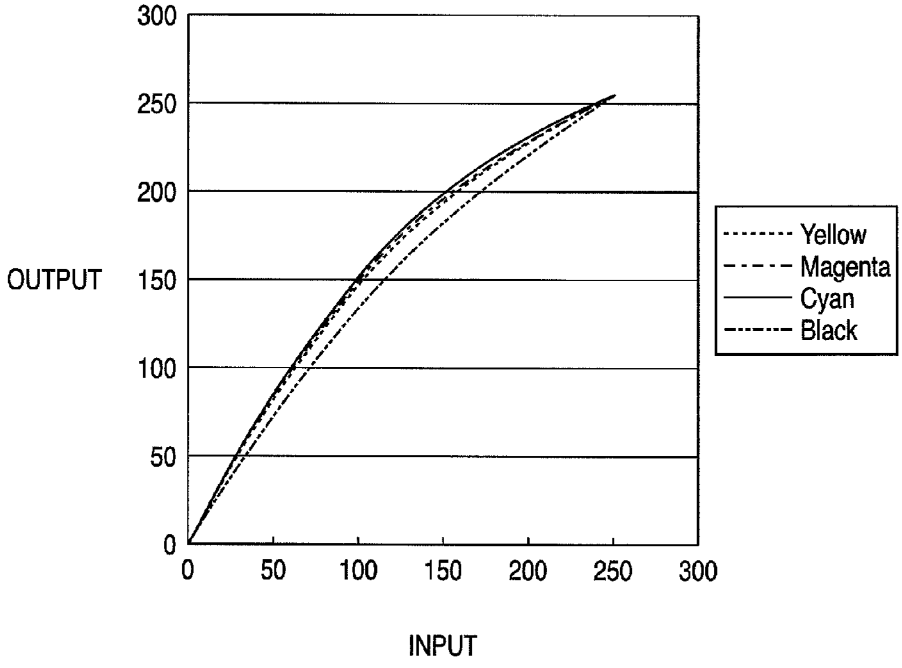
FIG. 12 is a graph showing the inverse characteristics of the characteristics shown in FIG. 6.

S705_2: C', M', Y', and K' are calculated using an inverse LUT which has characteristics inverse to the tone correction LUT, i.e., convex input/output characteristics, as shown in FIG. 12, when, for example, 8-bit data is input/output.

S706_2: End

This processing is performed to all pixels to be processed.

Figure 11A:
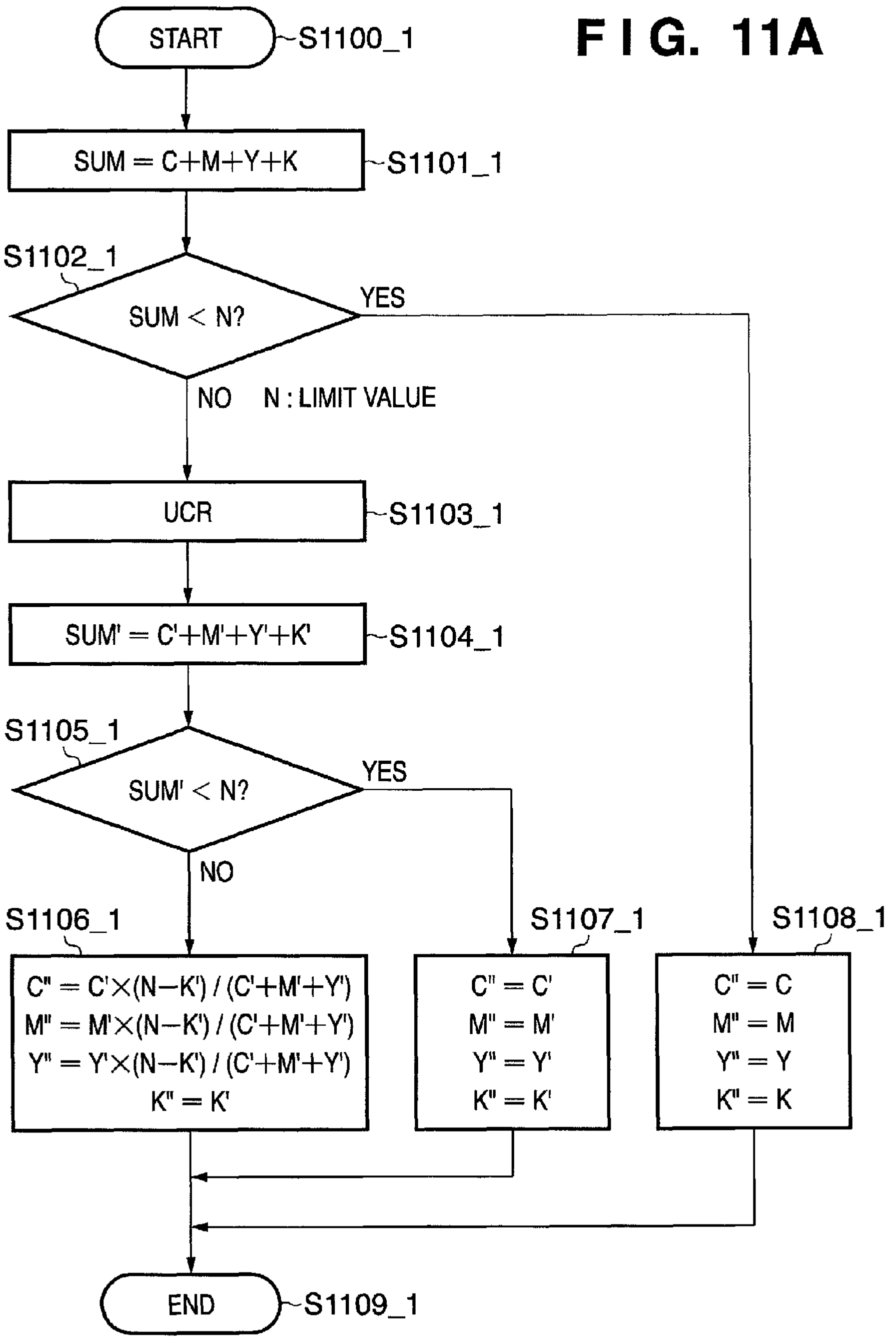
FIG. 11A is a flowchart of the toner reduction processing for converting input image signal values C, M, Y, and K into C", M", Y", and K" limited by a limit value N.
Figure 11B:
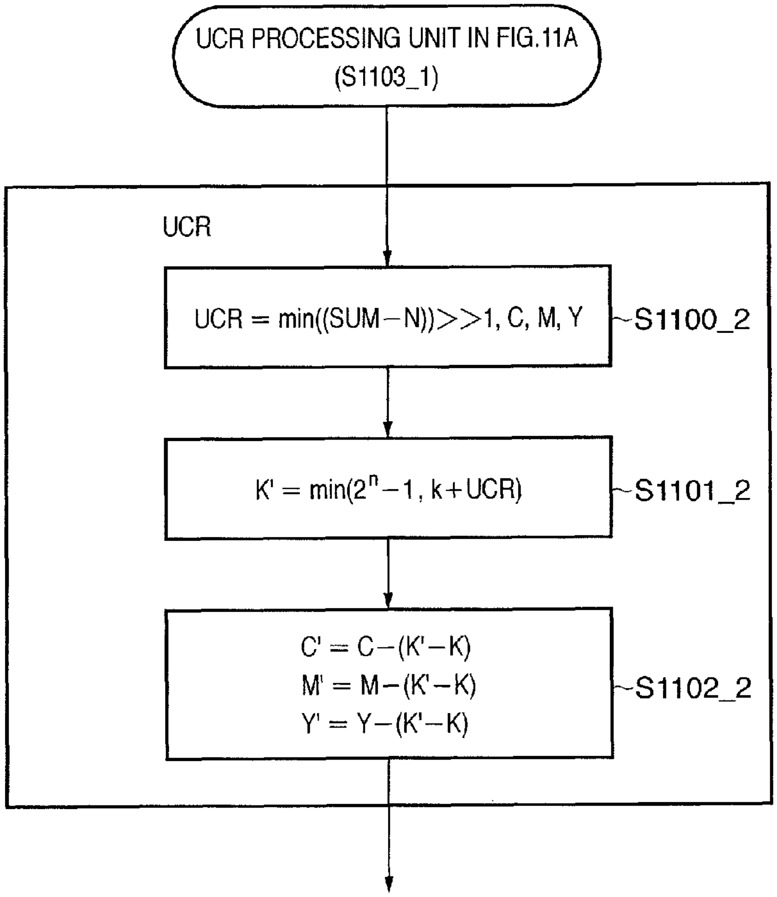
FIG. 11B is a view showing the process in UCR shown in FIG. 11A.

Various methods can be used in the toner reduction processing step (S704_2). One example is a toner reduction method shown in FIGS. 11A and 11B. FIG. 11A is a flowchart showing a toner reduction step. FIG. 11B shows processing (S1103_1) performed in a UCR unit in FIG. 11A. The processing shown in FIG. 11A will be sequentially described below.

S1100_1: Start

S1101_1: A sum of signal values (CMYK in this case) of all colors of an input pixel is calculated and set as SUM.

S1102_1: It is determined whether SUM is larger than a limit value N. If N<SUM, the process advances to S1103_1. If N≥SUM, the process advances to S1108_1.

S1103_1: UCR (Under Color Removal) processing is performed and the result is newly set as C', M', Y', and K'.

S1104_1: A sum of C', M', Y', and K' is calculated and set as SUM'.

S1105_1: It is determined whether SUM' is larger than the limit value N. If N<SUM', the process advances to S1106_1. If N≥SUM', the process advances to S1107_1.

S1106_1: A value K' obtained after the UCR is set as an output value K". A value N−K' obtained by subtracting the output black component K'(=K") from the limit value N is proportionally divided in accordance with the ratio of the input values C', M', and Y', and the obtained values are set as output values C", M", and Y".

S1107_1: The values C', M', Y', and K' obtained after the UCR are set as output values C", M", Y", and K", respectively.

S1108_1: The input values C, M, Y, and K are set as output values C", M", Y", and K", respectively.

S1109_1: End

The UCR processing S1103_1 in FIG. 11A is shown in FIG. 11B and its sequence is as described below.

S1100_2: Data is input from S1102_1. The maximum value of the color component values of C, M, and Y and a half value of a value (SUM−N) obtained by subtracting the limit value from the sum value of the input pixel values is set as a value UCR. Note that the halving operation is implemented by a one-bit shift to the right.

S1101_2: The smaller value of a possible maximum value ($2^n-1$) of the K component value and a value obtained by adding the value UCR obtained in S1100_2 to the original K component value K is set as a new K component value, i.e., K' after the toner reduction.

S1102_2: Values obtained by subtracting a difference (i.e., under color-reduced component) between the new K component value K' and the original K component value K from each of the original C, M, and Y value are set as values C', M', and Y' of the CMY components after the toner reduction. After that, the data is passed to S1104_1.

With the above-described processing, before reducing the toner amount, the toner amount is controlled with respect to the toner amount for output. Hence, excessive toner reduction can be prevented. The processing steps of the convention method and those of this embodiment have been described above. The specific effect of the proposed method will be described below using examples.

EXAMPLES

A conventional example is examined first. For example, when C, M, Y, K=(175, 175, 175, 175) and a limit value is 640

(about 250%) in the toner control unit (example 1), the limit value 640<a sum of input values=175×4=700. Accordingly, toner reduction is performed and the sum value of the color components decreases down to 640. In addition, after the above-described processing, the effect of tone correction via image processing or a device further decreases the sum value of the color components down to 510 (due to the effect of the tone target when the signal value is 175, the signal value decreases by about 20%).

When other values C, M, Y, K=(210, 220, 220, 50) (example 2) are input, the limit value 640<a sum of input values=210+220+220+50=700. Accordingly, toner reduction is performed and the sum value of the color components decreases down to 640.

In addition, after the above-described processing, the effect of tone correction via image processing or a device further decreases the sum value of the color components down to 610 (due to the effect of the tone target for the signal values of example 2, the signal values decrease by about 5%).

In the conventional method, when the input value is larger that the limit value, the toner amount is excessively reduced and falls below the limit value.

In the method of this embodiment, the toner control unit operates the toner amount for printer output (to be referred to as an operation A, hereinafter, that corresponds to S702_2 in FIG. 7B). Then, toner reduction is performed and the inverse operation of the operation A is performed at last (S705_2 in FIG. 7B). The operation A in this embodiment is performed using an LUT having an effect of the tone target.

With the above-described processing, toner amount control based on the density for printer output can be performed. The effects of the present invention in the above-described examples are as follows. In example 1, the value for toner output is calculated using the LUT having the characteristics of the tone target. The sum of the input values decreases from 700 to 560 due to the effect by the tone target. Next, the sum of the input values is compared with the control value 640. Since the control value 640>the sum of the input values=560, no toner amount control is performed. Lastly, the signal values are returned using the LUT having the inverse characteristics of the tone target. With this processing, the sum value of the color component values increases from 560 to 700.

In example 1, since the signal value decreases from 700 to 560 upon printer output due to the processing (print tone correction including gamma correction) performed after the toner control unit A201_1, no toner scattering and defective fixing caused by too high a density occur.

Similarly, when the processing is performed in example 2, the sum of the input values decreases from 700 to 665 due to the effect of the tone target. since the control value=640<the sum of the input values=665, toner reduction processing is performed. Due to the effect of the toner reduction processing, the sum of the pixel values is converted from 665 into 640. Lastly, for example, the sum of the pixel values is converted from 640 into 670 by using the LUT having the inverse characteristics of the tone target.

In example 2, since the sum of the color component values decreases from 670 to 640 upon printer output due to the print tone correction performed after the toner control unit A201_1, no toner scattering and defective fixing occur.

With the above-described processing, excessive toner reduction with respect to the control value is performed less than in the conventional example. Hence, it is possible to present a wider tone.

Second Embodiment

An embodiment to simultaneously perform toner reduction and color conversion will be described as the second embodiment. An apparatus has the structure shown in FIG. 1 and the like as in the first embodiment.

Figure 2B:
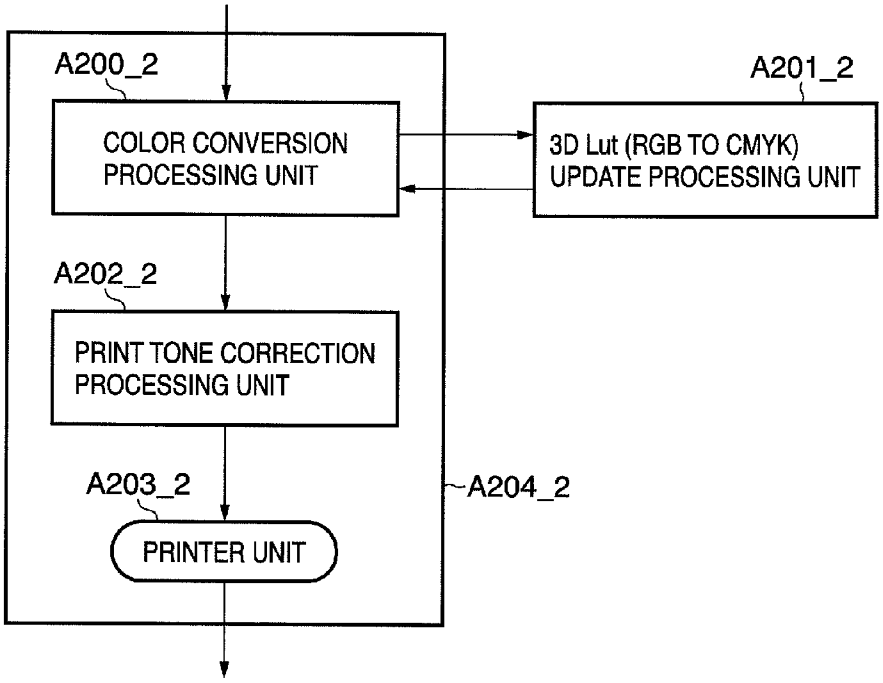
FIG. 2B is a view schematically showing the image processing and device processing performed when toner reduction is performed in a color conversion processing unit according to the second embodiment.

Conventional and proposed methods of toner reduction according to this embodiment will be described, which is performed by a 3D LUT update processing unit A201_2 in a color conversion processing unit A200_2 shown in FIG. 2B. A 3D LUT (3-dimensional look-up table) in this embodiment is a table for converting an RGB signal into a CMYK signal. The color conversion processing unit A200_2 is included in an image processing unit 102. FIG. 2B is a view schematically showing a part of processing of an image processing unit 102 and that of an image output unit 105.

A unit A200_2 in the image processing unit 102 is a color conversion processing unit which performs color conversion from an RGB image into a CMYK image. The unit A201_2 is a 3D LUT update processing unit which includes a toner control unit to limit toner reduction when the toner amount of CMYK data read out from the unit A200_2 is larger than a limit value, and updates the CMYK data when the reduction is executed. A unit A202_2 is a print tone correction processing unit which performs gamma conversion and correction of a change with time of output density of a printer. A unit A203_2 in the image processing unit 102 is a printer unit which outputs based on an image processing result.

When the color conversion processing unit A200_2 shown in FIG. 2B performs toner reduction, a CPU 104 (or a CPU included in the image processing unit 102) controls the 3D LUT update processing unit A201_2.

Figure 8A:
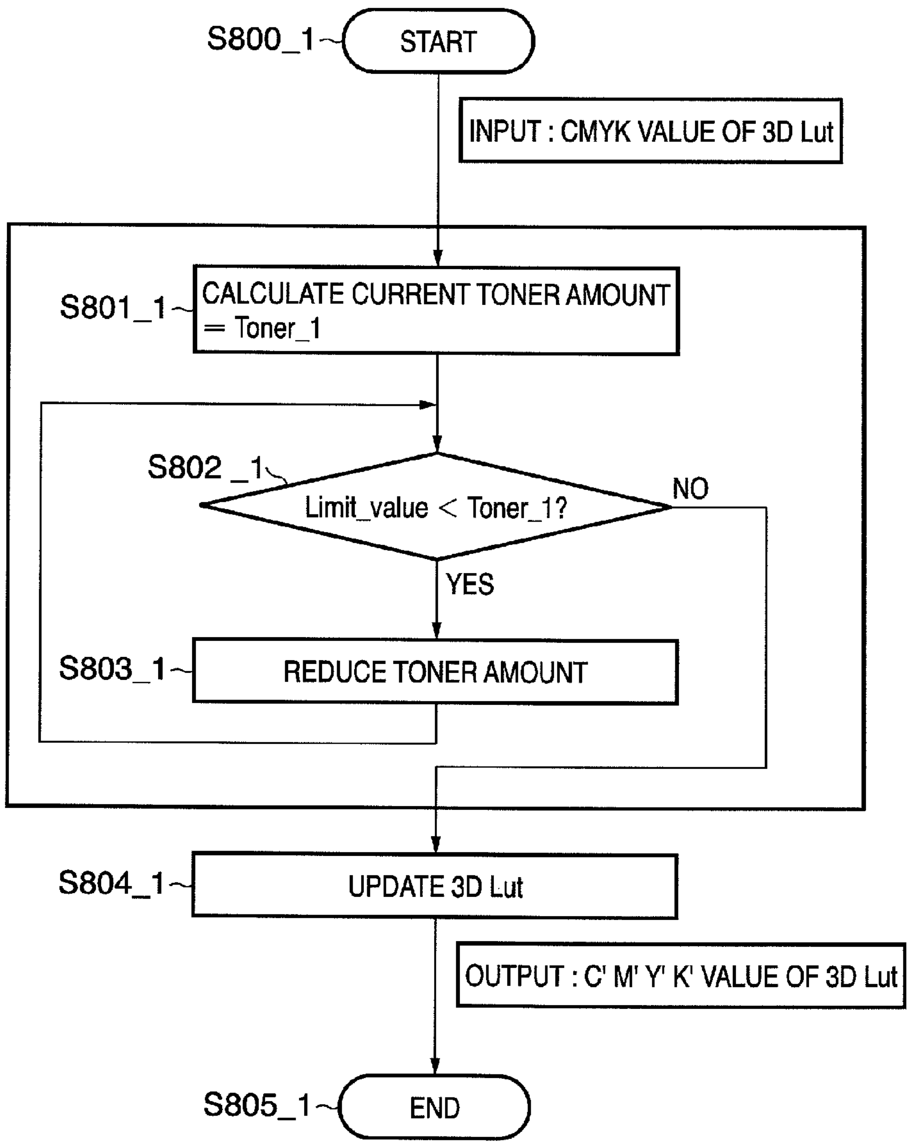
FIG. 8A is a conventional flowchart for performing toner reduction in the color conversion processing unit according to the second conventional method.

FIG. 8A shows the processing sequence of the conventional method by the 3D LUT update processing unit A201_2 in FIG. 2B. The processing sequence shown in FIG. 8A will be described below.

S800_1: Start

S801_1: A CMYK value corresponding to an input RGB value is read out from the 3D LUT. A current toner amount Toner_1 is calculated from the readout C, M, Y, and K values. For example, a value obtained by adding C, M, Y, and K values of the input pixel is calculated as the current toner amount.

S802_1: The sum of the C, M, Y, and K values of the input pixel is compared with a predetermined toner amount limit value Limit_value. When the sum of CMYK values is larger, the process advances to S803_1. Otherwise, the process advances to S804_1.

S803_1: Toner reduction limitation processing is performed and C', M', Y', and K' values are obtained. The process advances to S802_1. For example, a predetermined portion of each C, M, and Y color value is replaced by a K component. With this process, the CMY toner amounts can be reduced.

S804_1: When the toner amount of the CMYK value read out in S801_1 is smaller than the limit value, the CMYK value is updated with keeping the value unchanged. When the toner amount of the CMYK value read out in SS01_1 is larger than the limit value, the CMYK value is updated to the C'M'Y'K' value obtained in S603_1.

S805_1: End

In this conventional method, as in the conventional method described in the first embodiment, since the toner amount for print output is not calculated in the toner reduction processing, the toner amount is excessively reduced.

Figure 8B:
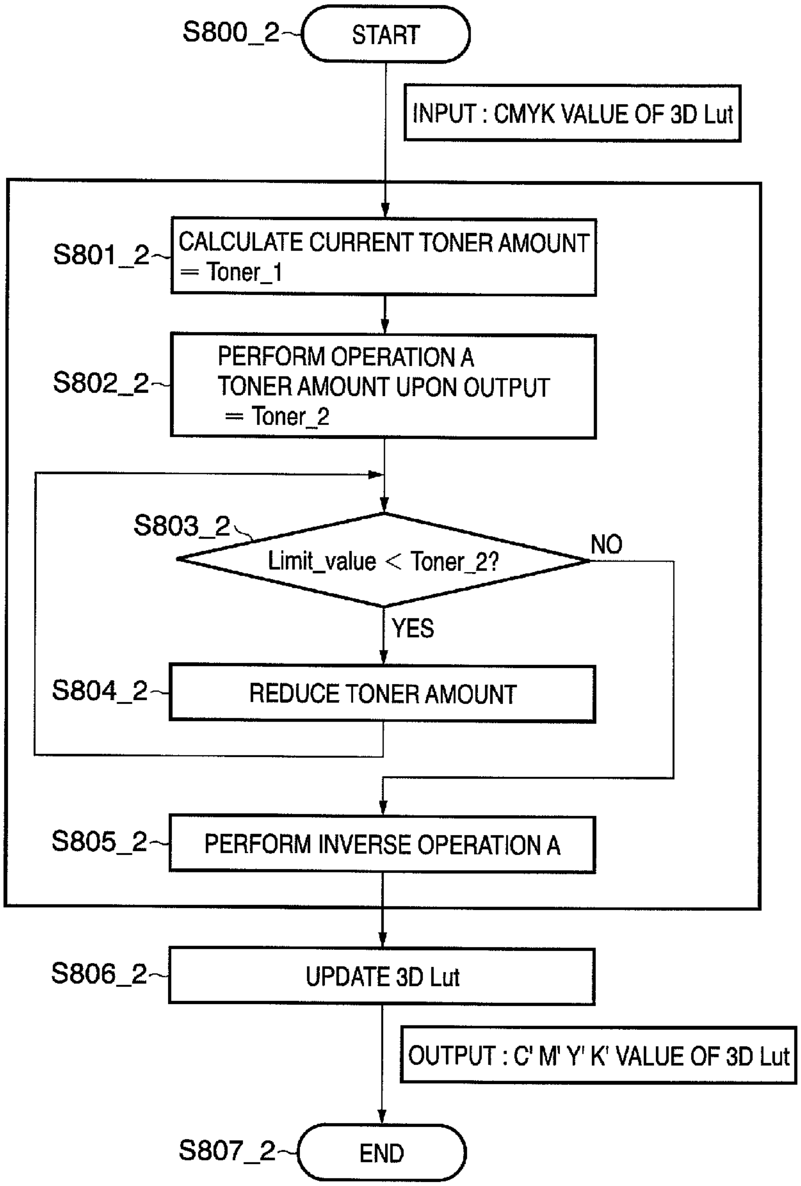
FIG. 8B is a proposed flowchart for performing toner reduction in the color conversion processing unit according to the second proposed method.

FIG. 8B shows processing steps of toner reduction by the proposed method performed in the color conversion processing unit A200_2 shown in FIG. 2B.

S800_2: Start

S801_2: A CMYK value corresponding to an input RGB value is read out from the 3D LUT. A current toner amount Toner_1 is calculated from the readout C, M, Y, and K values.

For example, a value obtained by adding C, M, Y, and K values of the input pixel is calculated as the current toner amount.

S802_2: Color component values C1, M1, Y1, and K1 for printer output are calculated from the C, M, Y, and K values transmitted from S801_2 by using a tone target correction LUT, and the process advances to the next step. The tone correction target LUT is given in advance based on gamma characteristics and calibration and has the concave downward input/output characteristics, as shown in FIG. 6, when, for example, 8-bit data is input/output. Accordingly, the conversion decreases the values.

S803_2: The sum of the C, M, Y, and K values obtained in S802_2 is compared with a predetermined toner amount limit value Limit value. When the sum of CMYK values is larger, the process advances to S804_2. Otherwise, the process advances to S805_2.

S804_2: Toner reduction limitation processing is performed and C', M', Y', and K' values are obtained. The process advances to S803_2. For example, a predetermined portion of each C, M, and Y color value is replaced by a K component. With this process, the CMY toner amounts can be reduced.

S805_2: C', M', Y', and K' are calculated using an inverse LUT (with convex input/output characteristics, as shown in FIG. 12, when, for example, 8-bit data is input/output) which has characteristics inverse of the tone target correction LUT.

S806_2: When the toner amount of the CMYK value output in S802_2 is smaller than the limit value, the values of 3D LUT are updated while keeping the CMYK values unchanged. On the other hand, when the toner amount of the CMYK value output in S802_2 is larger than the limit value, the values of 3D LUT are further updated to the C'M'Y'K' values obtained in S804_2.

S807_2: End

The toner reduction method in step S805_2 may use the method shown in FIGS. 11A and 11B, as in the first embodiment.

In the above-described method, since the toner amount to be output by a printer is considered upon toner reduction, it can be appropriately reduced.

According to this embodiment, since toner reduction can be performed at the same time as color conversion, while the same effect as in the first embodiment can be obtained, the processing load is smaller than in the first embodiment.

Note that in this embodiment, it is desirable to limit the color conversion LUT only for each predetermined processing or asynchronously with the print processing. More specifically, the processing in A201_2 shown in FIG. 2B is performed periodically or at a timing designated by a user, and the obtained 3D LUT before conversion is stored. Upon outputting the image, A201_2 is skipped and the process is performed from A200_2. With this arrangement, the processing load to calculate a LUT for every image processing can be reduced. In this case, toner reduction processing is performed to the whole input RGB region of the LUT.

Third Embodiment

An embodiment of toner reduction in which an image quality control function such as density control is taken into consideration will be described in the third embodiment.

Figure 3A:
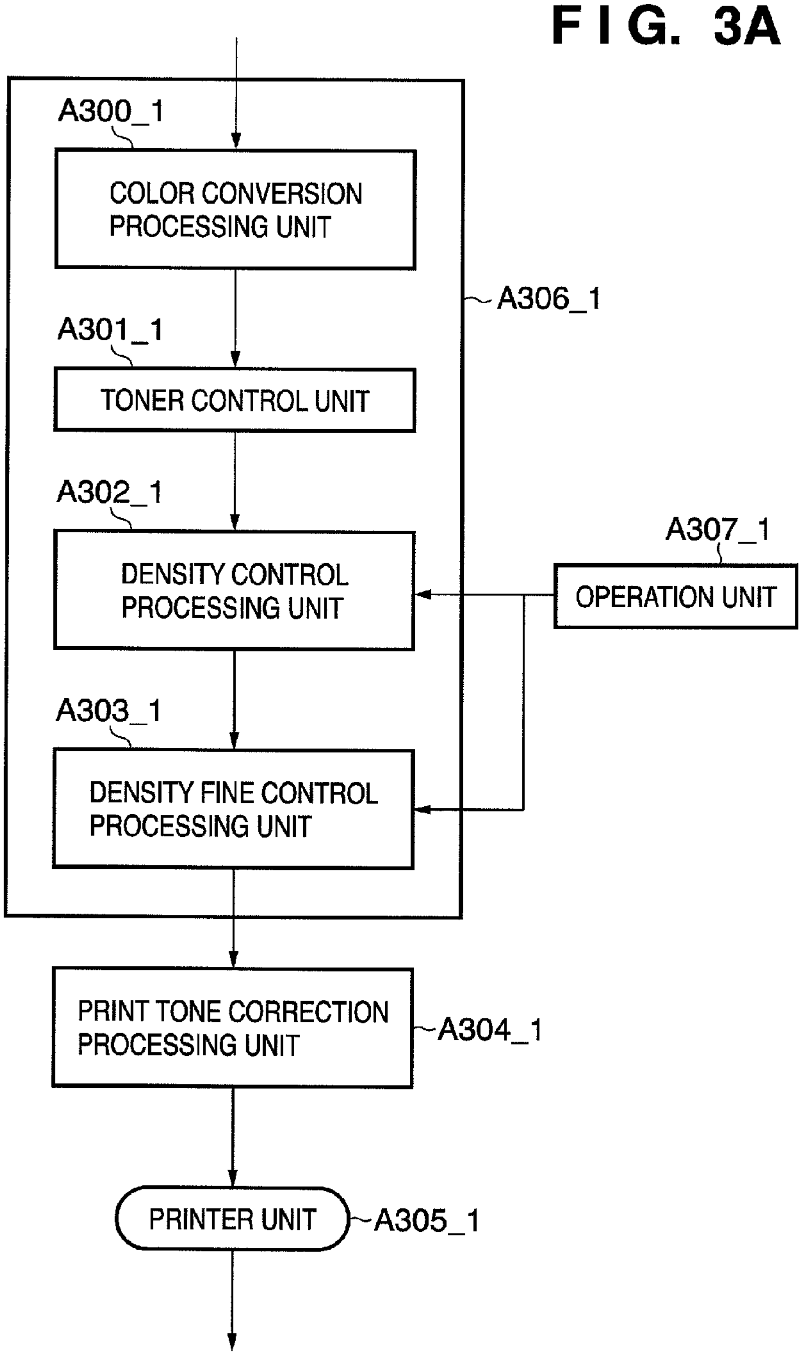
FIG. 3A is a view schematically showing the image processing and device processing according to the third conventional method.

FIGS. 3A and 7A show a conventional method. An apparatus introduced in this embodiment has the same structure as those of the first and second embodiments.

A unit A300_1 is a color conversion processing unit which performs color conversion from an RGB image into a CMYK image. A unit A301_1 is a toner control unit which reduces a toner amount when it is larger than a limit value. A unit A302_1 is a density control processing unit which performs image quality control such as density control. A unit A303_1 is a density fine control processing unit which performs density control based on a density region. A unit A304_1 is a print tone correction processing unit which performs gamma conversion and correction of a change with time of output density of a printer. A unit A305_1 is a printer unit which outputs based on an image processing result. A unit A306_1 is an image processing unit which performs various image processing performed in, e.g., the color conversion processing unit A300_1 and toner control unit A301_1. A unit A307_1 is a UI unit by which a user sets various kinds of settings.

FIG. 7A shows the toner reduction processing step by the proposed method in the toner control unit A301_1 shown in FIG. 3A. This step is the same as that described in the first embodiment.

In the conventional method, the image quality control function is executed after toner control is performed. Hence, density may become larger than the limit value.

Figure 3B:
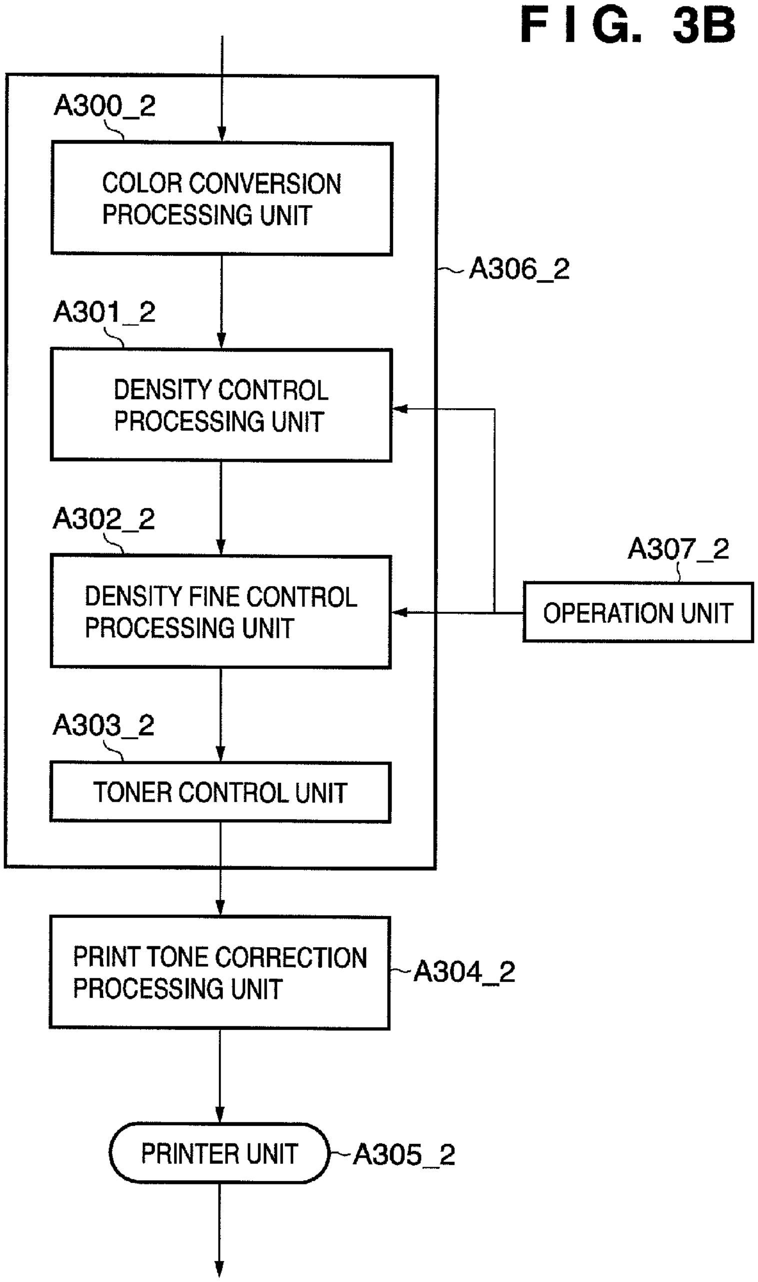
FIG. 3B is a view schematically showing the image processing and device processing according to the third proposed method.

FIGS. 3B and 7B show the proposed method.

A unit A300_2 is a color conversion processing unit which performs color conversion from an RGB image into a CMYK image. A unit A301_2 is a density control processing unit which performs image quality control such as density control. A unit A302_2 is a density fine control processing unit which performs density control based on a density region. A unit A303_2 is a toner control unit which reduces a toner amount when it is larger than a limit value. A unit A304_2 is a print tone correction processing unit which performs, gamma conversion and correction of a change with time of output density of a printer. A unit A305_2 is a printer unit which outputs based on an image processing result. A unit A306_2 is an image processing unit which performs various image processing performed in, e.g., the color conversion processing unit A300_2 and toner control unit A303_2. A unit A307_2 is a UI unit by which a user sets various kinds of settings. FIG. 7B shows the toner reduction processing step by the proposed method in the toner control unit A303_2 shown in FIG. 3B. This step is same as that described in the first embodiment.

According to the proposed method, the image quality control function is executed before toner control is performed. Hence, the density does not become larger than the limit value.

Fourth Embodiment

An embodiment of toner reduction in which an image quality control function such as density control is taken into consideration in the second embodiment will be described. An apparatus has the same structure as in the first, second, and third embodiments. A conventional processing will be described first with reference to FIGS. 3C and 9A.

Figure 3C:
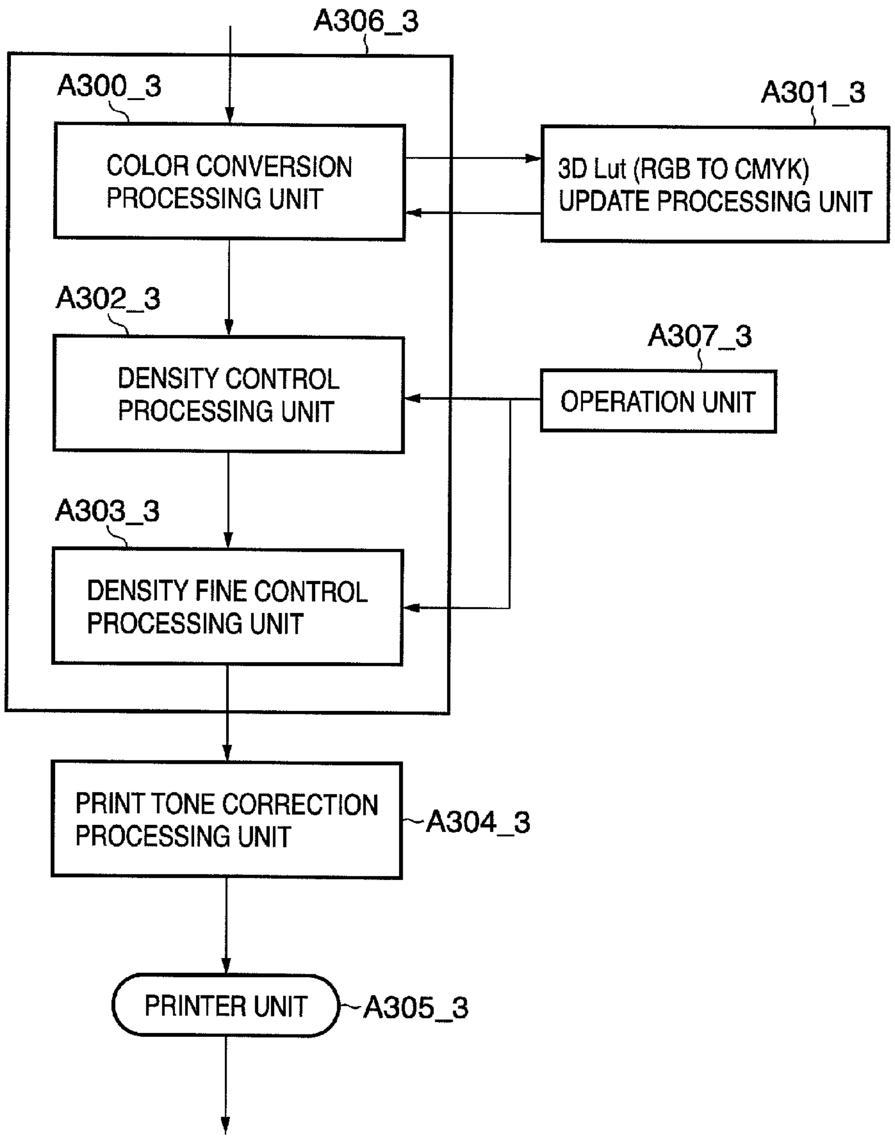
FIG. 3C is a view schematically showing the image processing and device processing according to the fourth conventional method.

FIG. 3C is a view schematically showing the conventional processing sequence executed by an image processing unit 102 and image output unit 105 when an image quality control function such as density control is taken into consideration. In this embodiment, a user uses an operation unit A307_3 (corresponding to the user interface 106) to set the image quality function such as density fine control. This information is transmitted to a 3D LUT update processing unit A301_3 in a color conversion processing unit A300_3, and 3D LUT update processing is performed in accordance with setting of the image quality control function.

The unit A300_3 is the color conversion processing unit which performs color conversion from an RGB image into a CMYK image. The unit A301_3 is a 3D LUT update processing unit which rewrites and updates the 3D LUT for converting an RGB image into a CMYK image. A unit A302_3 is a density control processing unit which performs image quality control such as density control. A unit A303_3 is a density fine control processing unit which performs density control based on a density region. A unit A304_3 is a print tone correction processing unit which performs gamma conversion and correction of a change with time of output density of a printer. A unit A305_3 is a printer unit which outputs based on an image processing result. A unit A306_3 is an image processing unit which performs various image processing performed in, e.g., the color conversion processing unit A300_3 and density control processing unit A302_3. A unit A307_3 is an operation unit by which a user sets various kinds of settings.

Figure 9A:
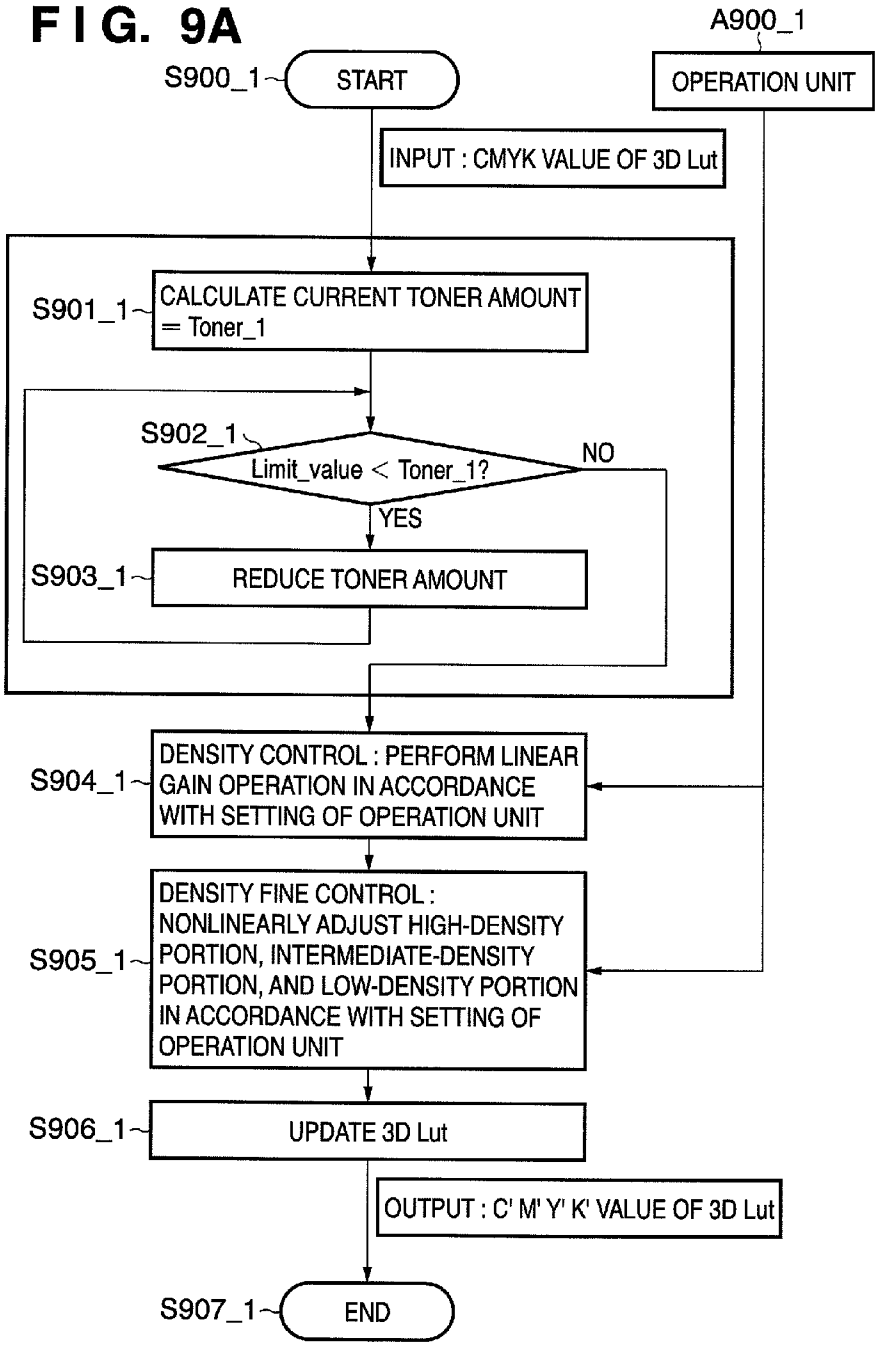
FIG. 9A is a flowchart for performing toner reduction when an image quality control function according to the fourth conventional method is executed.

FIG. 9A shows a processing sequence by the image processing unit 102 which includes the color conversion processing unit A300_3, toner control unit A301_3, density control processing unit A302_3, and density fine control processing unit A303_3 and the UI unit 106 which corresponds to the operation unit A307_3. The processing sequence shown in FIG. 9A will be described below.

S900_1: Start

S901_1: A CMYK value corresponding to an input RGB value is read out from the 3D LUT. A current toner amount Toner_1 is calculated from the readout C, M, Y, and K values. For example, a value obtained by adding C, M, Y, and K values of the input pixel is calculated as the current toner amount.

S902_1: The sum of the C, M, Y, and K values of the input pixel is compared with a predetermined toner amount limit value Limit_value. When the sum of CMYK values is larger, the process advances to S903_1. Otherwise, the process advances to S904_1.

S903_1: Toner reduction limitation processing is performed and C', M', Y', and K' values are obtained. The process advances to S902_1. For example, a predetermined portion of each C, M, and Y color value is replaced by a K component. With this process, the CMY toner amounts can be reduced.

S904_1: A linear gain operation is performed in accordance with the setting of the operation unit A900_1.

S905_1: A high-density portion, intermediate-density portion, and low-density portion are nonlinearly adjusted for the C, M, Y, and K values obtained in S904_1 in accordance with the setting of the operation unit.

S906_1: The CMYK value corresponding to the input RGB is updated to the value obtained in S901_1.

S907_1: End

The process is ended as described above. As is apparent from the above-described steps, no toner reduction is performed after the image control. In this case, the toner amount sometimes exceeds the limit value. Hence, tone scattering or defective fixing may occur. In addition, the toner amount is sometimes excessively reduced.

Figure 3D:
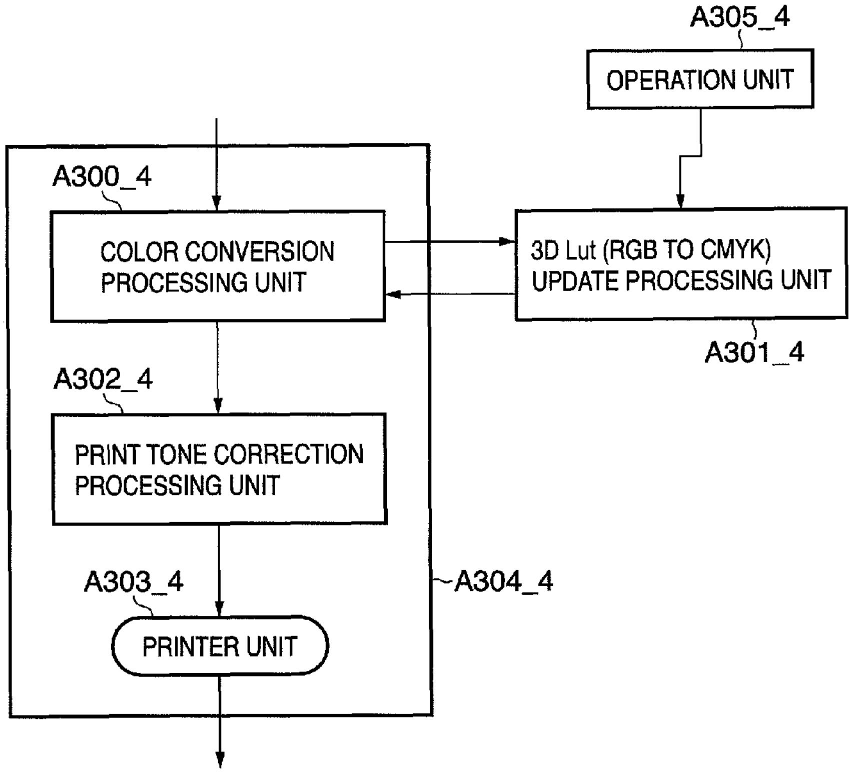
FIG. 3D is a view schematically showing the image processing and device processing according to the fourth proposed method.
Figure 4:
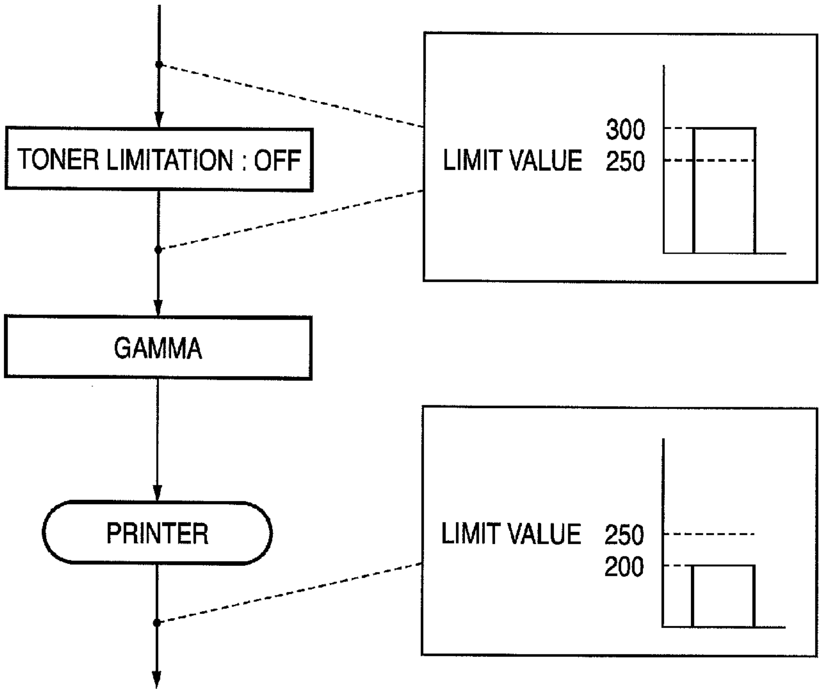
FIG. 4 is a view showing a change in the amount of a tone target when toner control is off.
Figure 5:
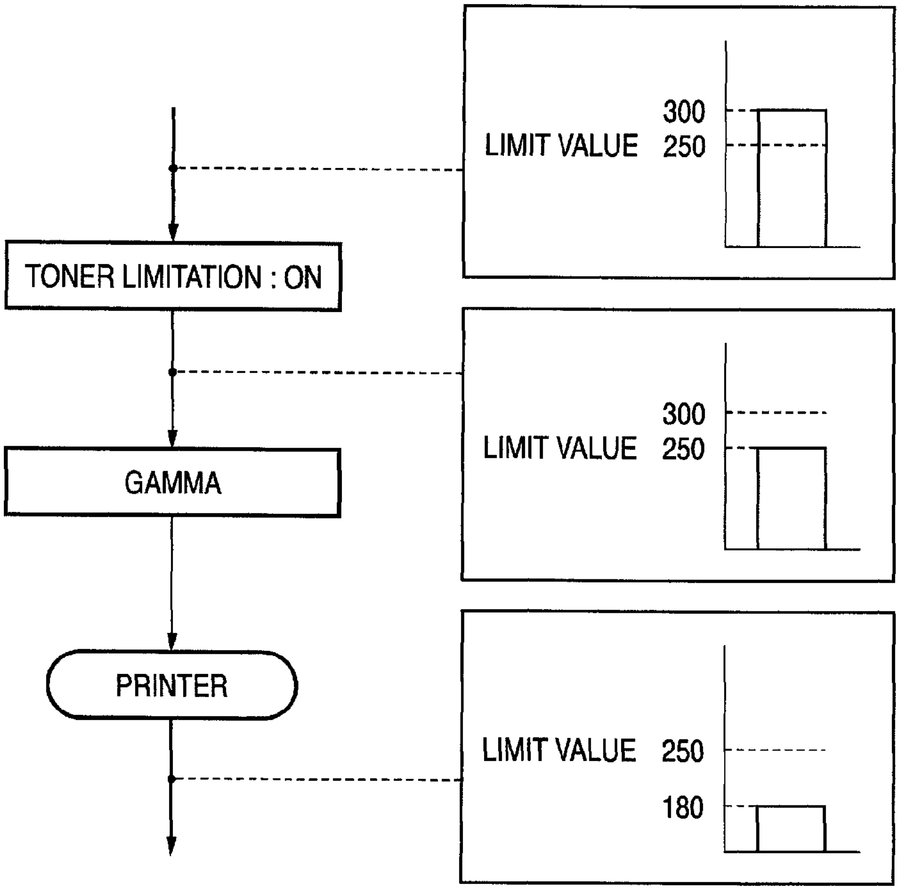

The processing performed in this embodiment will be described with reference to FIGS. 3D and 9B. FIG. 3D is a view schematically showing the processing sequence executed by an image processing unit 102 and image output unit 105 according to this embodiment. In the method of this embodiment, image quality is controlled before toner reduction.

A unit A300_4 is a color conversion processing unit which performs color conversion from an RGB image into a CMYK image. A unit A301_4 is a 3D LUT update processing unit which rewrites and updates the 3D LUT for converting an RGB image into CMYK image. A unit A302_4 is a print tone correction processing unit which performs gamma conversion and correction of a change with time of output density of a printer. A unit A305_3 is a printer unit which outputs based on an image processing result.

FIG. 3C shows the same processing sequence as in the conventional example.

Figure 9B:
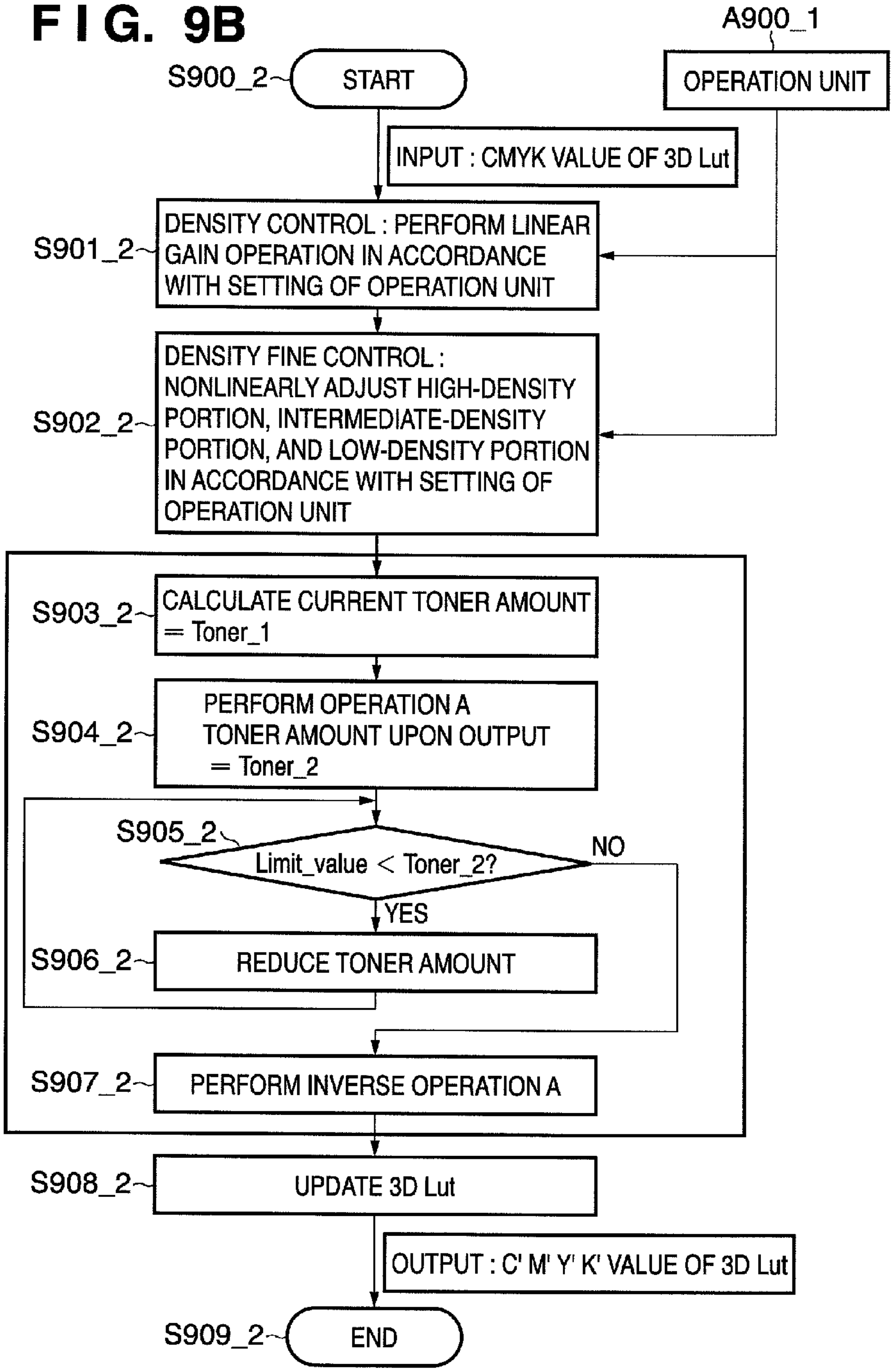
FIG. 9B is a flowchart for performing toner reduction when an image quality control function according to the fourth embodiment is executed.

FIG. 9B shows the processing sequence executed by the color conversion processing unit A300_4 and the UI unit of the operation unit A305_4 in FIG. 3D. The processing sequence in FIG. 9B will be described below.

S900_2: Start

S901_2: A CMYK value corresponding to an input RGB value is read out from the 3D LUT. A linear gain operation is performed to the readout CMYK value in accordance with the setting of the operation unit A305_4.

A high-density portion, intermediate-density portion, and low-density portion are nonlinearly adjusted in S902_2 for the obtained C, M, Y, and K values in accordance with the setting of the operation unit.

S903_2: A current toner amount Toner_1 is calculated. For example, a value obtained by adding C, M, Y, and K values is calculated as the current toner amount.

S904_2: Color component values C1, M1, Y1, and K1 for printer output are calculated from the C, M, Y, and K values transmitted from S903_2 by using a tone target correction LUT, and the process advances to the next step. The tone correction target LUT is given in advance based on gamma characteristics and calibration and has the concave downward input/output characteristics, as shown in FIG. 6, when, for example, 9-bit data is input/output. Accordingly, the conversion decreases the values.

S905_2: The sum of the C, N, Y, and K values obtained in S904_2 is compared with a predetermined toner amount limit value Limit_value. When the sum of CMYK values is larger, the process advances to S906_2. Otherwise, the process advances to S907_2.

S906_2: Toner reduction limitation processing is performed and C', M', Y', and K' values are obtained. The process advances to S905_2. For example, a predetermined portion of each C, M, and Y color value is replaced by a K component. With this process, the CMY toner amounts can be reduced.

S907_2: C', M', Y', and K' are calculated using an inverse LUT (with convex input/output characteristics, as shown in FIG. 12, when, for example, 9-bit data is input/output) which has characteristics inverse of the tone target correction LUT.

S908_2: When the toner amount of the readout CMYK value is smaller than the limit value in S905_2, the values of 3D LUT are updated while keeping the CMYK values unchanged. On the other hand, when the toner amount of the readout CMYK value is larger than the limit value in S905_2, the values of 3D LUT are updated to the C'M'Y'K' values obtained in S906_2.

S909_2: End

The process is ended as described above.

The specific processing in steps S901_2 and S902_2 will be described below. In the density control processing in step S901_2, a linear gain operation is performed for each C, M, Y, and K, by using:

$$Y=(X+\text{offset})*\text{Gain}/\text{Div}$$

wherein offset, Gain, and Div are parameters which a user can independently set for each C, M, Y, and K, and X and Y are an input and output, respectively.

In the density fine control processing in step S902_2, a low-density region S, intermediate-density region M, and high-density region H for each C, M, Y, and K are nonlinearly controlled by:

$$Y=X+\Delta H(X)*fH(v)+\Delta M(x)*fM(v)+\Delta S(x)*fS(v)$$

wherein v is an integer between −8 and +8, and f is the modulation amount.

The toner reduction method in step S704_2 may use the method shown in FIGS. 11A and 11B as in the first and second embodiments.

With the above-described manner, even when an image quality control function such as density control is adjusted, it is possible to prevent the toner amount from exceeding the limit value, thereby preventing occurrence of toner scattering and detective fixing. In addition, excessive toner reduction can also be prevented, thereby preventing image quality deterioration.

Other Embodiments

The preferred embodiments have been described above in detail. However, the present invention can include an embodiment of, for example, a system, apparatus, method, program, storage medium (recording medium), or the like. More specifically, the present invention may be applied to a system made up of a plurality of devices, or an apparatus formed from one device.

The present invention can be implemented by supplying a software program (a program corresponding to the flowcharts shown in the drawings according to the embodiments), which implements the functions of the foregoing embodiments, directly or indirectly to a system or apparatus, reading the supplied program code with a computer of the system or apparatus, and then executing the program code.

Accordingly, the program code installed in the computer in order to implement the functional processing of the present invention by the computer also implements the present invention. In other words, the present invention also includes a computer program itself for the purpose of implementing the functional processing of the present invention.

In this case, so long as functions of the program are provided, they may be executed in any form, such as an object code, a program executed by an interpreter, or script data supplied to an OS.

Examples of recording media that can be used for supplying the program are a flexible disk, a hard disk, an optical disk, a magneto-optical disk, an MO, a CD-ROM, a CD-R, a CD-RW, a magnetic tape, a non-volatile type memory card, a ROM, and a DVD (DVD-ROM and DVD-R).

As for the method of supplying the program, a client computer can be connected to a homepage on the Internet using a browser of the client computer, and the computer program of the present invention or an automatically-installable compressed file of the program can be downloaded from the homepage to a recording medium such as a hard disk. Further, the program of the present invention can be supplied by dividing the program code constituting the program into a plurality of files and downloading the files from different homepages. In other words, a WWW server that downloads, to multiple users, the program files that implement the functional processing of the present invention by the computer is also included in the present invention.

It is also possible to encrypt and store the program of the present invention on a storage medium such as a CD-ROM, distribute the storage medium to users, allow users who meet certain requirements to download decryption key information from a homepage via the Internet, and allow these users to decrypt the encrypted program by using the key information, thereby the program is installed in the user computer.

Besides the cases wherein the aforementioned functions according to the embodiments are implemented by executing the read program by computer, an OS or the like running on the computer may perform all or a part of the actual processing on the basis of an instruction of the program so that the functions of the foregoing embodiments can be implemented by this processing.

Furthermore, after the program read from the recording medium is written to a function expansion board inserted into the computer or to a memory provided in a function expansion unit connected to the computer, a CPU or the like mounted on the function expansion board or function expansion unit performs all or a part of the actual processing on the basis of an instruction of the program so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-135864, filed May 15, 2006, which is hereby incorporated by reference herein in its entirety.

What is claimed is:

1. An image processing apparatus, comprising:

a processor;

a first tone correction unit configured to, for each of a plurality of color components, perform tone correction processing to a color component value of a pixel in image data using a correction characteristic corresponding to a color component;

a comparison unit configured to compare a sum of the plurality of color component values corrected by said first tone correction unit in the pixel with a limit value;

a control unit configured to decrease the plurality of color component values corrected by the first tone correction unit so that the sum of the color component values is less than or equal to the limit value in the pixel in a case where the sum of the color component values corrected by said first tone correction unit is greater than the limit value; and a second tone correction unit configured to, for each of the plurality of color components, perform tone correction processing to the color component value decreased by said control unit using a correction characteristic corresponding to a color component, wherein the correction characteristic in the first tone correction unit and the correction characteristic in the second tone correction unit are axisymmetric to each other, wherein at least one of the first tone correction unit, the comparison unit, the control unit, and the second tone correction unit is implemented by the processor.

2. The apparatus according to claim 1, wherein the sum of the color component values is a total amount of values of cyan, magenta, yellow and black components of each pixel corrected by said first tone correction unit.

3. The apparatus according to claim 1, wherein said control unit performs an under color removal (UCR) processing for respective color component values corrected by the first tone correction unit to decrease the sum of the color components values corrected by the first tone correction unit.

4. The apparatus according to claim 1, further comprising a third tone correction unit configured to perform print tone correction processing that decreases the color component values for the color component values corrected by said second tone correction unit.

5. The apparatus according to claim 1, wherein the correction characteristic in the first tone correction unit has a concave downward input/output characteristic.

6. The apparatus according to claim 1, wherein said control unit decreases the color component values only in a case where the sum of the color component values corrected by said first tone correction unit is greater than the limit value.

7. An image processing method performed by an image processing apparatus using a processor, said method comprising:

a first tone correction step of, for each of a plurality of color components, performing tone correction processing to a color component value of a pixel in image data using a correction characteristic corresponding to a color component;

a comparison step of comparing a sum of the plurality of color component values corrected in the first tone correction step in the pixel with a limit value;

a control step of decreasing the plurality of color component values corrected in the first tone correction step so that the sum of the color component values is less than or equal to the limit value in the pixel in a case where the sum of the color component values corrected in the first tone correction step is greater than the limit value; and a second tone correction step of, for each of a plurality of color components, performing tone correction processing to the color component value decreased in the control step using a correction characteristic to a color component, wherein the correction characteristic in the first tone correction step and the correction characteristic in the second tone correction step are axisymmetric to each other.

8. A non-transitory computer-readable medium storing a program for causing a computer to perform an image processing method, said method comprising:

a first tone correction step of, for each of a plurality of color components, performing tone correction processing to a color component value of a pixel in image data using correction characteristic corresponding to a color component;

a comparison step of comparing a sum of the plurality of color component values corrected in the first tone correction step in the pixel with a limit value;

a control step of decreasing the plurality of color component values corrected in the first tone correction so that the sum of a color component values is less than or equal to the limit value in the pixel in a case where the sum of the color component values corrected in the first tone correction step is greater than the limit value; and a second tone correction step of, for each of a plurality of color components, performing tone correction processing to the color component value decreased in the control step using a correction characteristic corresponding to a color component, wherein the correction characteristic in the first tone correction step and the correction characteristic in the second tone correction step are axisymmetric to each other.

9. The apparatus according to claim 4, wherein the print tone correction processing is a temporal correction by which a temporal change of output density of a printer is corrected.

10. The apparatus according to claim 1, wherein the correction characteristic in the first tone correction unit is a characteristic to decrease a color component value.

11. The apparatus according to claim 1, wherein the correction characteristic in the second tone correction unit is a characteristic to increase a color component value.

* * * * *